US012665458B2

(12) United States Patent
Zhang et al.

(10) Patent No.: US 12,665,458 B2
(45) Date of Patent: Jun. 23, 2026

(54) MOTOR STATOR AND MOTOR USING THE SAME

(71) Applicants:ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

(72) Inventors: Zengjie Zhang, Ningbo (CN); Ou Ruan, Ningbo (CN); Li Zhang, Ningbo (CN); Xindong Sun, Ningbo (CN); Dianye Zhu, Ningbo (CN); Tao Li, Ningbo (CN); Hao Tang, Ningbo (CN); Hongkai Zhang, Ningbo (CN); Xiandong Zhang, Ningbo (CN)

(73) Assignees: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 280 days.

(21) Appl. No.: 18/676,341

(22) Filed: May 28, 2024

(65) Prior Publication Data

US 2024/0333058 A1    Oct. 3, 2024

Related U.S. Application Data

(63) Continuation of application No. PCT/CN2023/079300, filed on Mar. 2, 2023.

(30) Foreign Application Priority Data

Mar. 29, 2022    (CN) .......................... 202210318639.9

(51) Int. Cl.
    *H02K 3/28*    (2006.01)
    *H02K 1/16*    (2006.01)

(52) U.S. Cl.
    CPC ................. *H02K 3/28* (2013.01); *H02K 1/16* (2013.01)

(58) Field of Classification Search
    CPC .............. H02K 3/28; H02K 1/16; H02K 3/12; H02K 15/064; H02K 2213/03
    (Continued)

(56) References Cited

U.S. PATENT DOCUMENTS 6,201,332 B1    3/2001    Umeda et al.
6,459,186 B1    10/2002    Umeda et al.
(Continued)

FOREIGN PATENT DOCUMENTS

CN    1202028 A    12/1998
CN    102714439 A    10/2012
(Continued)

OTHER PUBLICATIONS

Extended European Search Report in related European Application No. 23777746.1 dated Oct. 17, 2025 (7 pages).
(Continued)

*Primary Examiner* — Alexander A Singh
(74) *Attorney, Agent, or Firm* — Bayes PLLC

(57)    ABSTRACT

A motor stator includes a stator core having a stator slot, and a stator winding inserted into the stator slot. Each stator slot includes slot layers. The stator winding includes first and second conductors each including two straight segment parts. The straight segment parts of the first conductors are separately located at two adjacent slot layers. One straight segment part of the second conductor and one straight segment part of the first conductor are located in a same stator slot. A pitch of the first conductor is y1, a pitch of the (Continued)

second conductor is y2, a pole pitch of the stator winding is $\tau$, a distance between straight segment parts of two adjacent first conductors at a same slot layer is L1, a distance between straight segment parts of two adjacent second conductors at a same slot layer is L2, and the followings are met: $y1=\tau$, $L1=\tau$ or $L1=y2$, and $L2=\tau$.

20 Claims, 8 Drawing Sheets

(58) Field of Classification Search
USPC ................................................... 310/179, 198
See application file for complete search history.

(56) References Cited

U.S. PATENT DOCUMENTS

| | | | |
|---|---|---|---|
| 2003/0122441 A1* | 7/2003 | Masegi | H02K 15/24 |
| | | | 310/208 |
| 2003/0132680 A1 | 7/2003 | Nakamura et al. | |
| 2003/0230949 A1 | 12/2003 | Ogawa et al. | |
| 2006/0033394 A1 | 2/2006 | Ogawa et al. | |
| 2007/0200448 A1 | 8/2007 | Oowatari et al. | |
| 2011/0260563 A1 | 10/2011 | Utaka | |
| 2012/0228989 A1* | 9/2012 | Okimitsu | H02K 3/12 |
| | | | 310/260 |
| 2014/0070646 A1 | 3/2014 | Isoda et al. | |
| 2017/0317565 A1 | 11/2017 | Hatch et al. | |

FOREIGN PATENT DOCUMENTS

| | | |
|---|---|---|
| CN | 105914916 A | 8/2016 |
| CN | 207368781 U | 5/2018 |
| CN | 110417149 A | 11/2019 |
| CN | 110784043 A | 2/2020 |
| CN | 113300503 A | 8/2021 |
| CN | 214412445 U | 10/2021 |
| CN | 113783334 A | 12/2021 |
| CN | 113794302 A | 12/2021 |
| CN | 114552811 A | 5/2022 |
| CN | 114552812 A | 5/2022 |
| CN | 114629263 A | 6/2022 |
| EP | 3240148 A1 | 11/2017 |
| JP | 200423807 A | 1/2004 |
| JP | 2007259577 A | 10/2007 |
| KR | 101843692 B1 | 3/2018 |

OTHER PUBLICATIONS

International Search Report issued in corresponding International Application No. PCT/CN2023/079300, mailed on May 29, 2023, 6 pages.

* cited by examiner

MOTOR STATOR AND MOTOR USING THE SAME

CROSS-REFERENCE TO RELATED APPLICATIONS

This application is a continuation of International Application No. PCT/CN2023/079300, filed on Mar. 2, 2023, which claims the benefit of priority to Chinese Application No. 202210318639.9, filed on Mar. 29, 2022, both of which are hereby incorporated by reference in their entireties.

TECHNICAL FIELD

The present disclosure relates to the field of motor technologies, and in particular, to a motor stator and a motor using the same.

BACKGROUND

With the development trend of lightweight and electrification of vehicles, a higher requirement is put forward for a high-power density and a high torque density of an automotive motor. A flat wire (rectangular wire) manner is used for winding a stator core. This can significantly increase a bare copper slot fill factor of the stator coil, thereby greatly improving motor efficiency.

However, there is a phenomenon that one conductor surrounds another conductor among a plurality of coil conductors of an existing winding formed by connecting stator hairpin coils. The height of a bending part of the winding is relatively high. In a production process, insulation damage may be easily caused between conductors at an upper layer and a lower layer thereof, and the conductors at the upper layer and the lower layer are prone to breakdown during running at a high voltage.

SUMMARY

The present disclosure provides a motor stator, including a stator core, having stator slots, the stator slot including several slot layers, and the slot layers being disposed in a radial direction of the stator core; and a stator winding, inserted into the stator slot. The stator winding includes a plurality of first conductors and a plurality of second conductors, and each of a first conductor and a second conductor includes two straight segment parts. The straight segment parts of the plurality of first conductors are separately located at two adjacent slot layers, both the first conductor and the second conductor include two straight segment parts, and one straight segment part of the second conductor and one straight segment part of the first conductor are located in a same stator slot. A pitch of the first conductor is y1, a pitch of the second conductor is y2, a pole pitch of the stator winding is $\tau$, at a same slot layer a distance between two adjacent first conductors is L1, a distance between two adjacent second conductors is L2, and the followings are met: $y1=\tau$, $L1=\tau$ or $L1=y2$, and $L2=\tau$.

In an embodiment of the present disclosure, the two straight segment parts of the second conductor are located at a same slot layer.

In an embodiment of the present disclosure, the stator winding includes at least one phase winding.

In an embodiment of the present disclosure, each phase winding includes at least two branch windings, and the branch windings are connected in series or in parallel.

In an embodiment of the present disclosure, each phase winding includes two branch windings, and straight segment parts of the second conductors in the two branch windings are located in adjacent stator slots.

In an embodiment of the present disclosure, straight segment parts of the first conductors in the two branch windings are located in adjacent stator slots.

In an embodiment of the present disclosure, the stator winding further includes third conductors, located between the first conductors and the second conductors. Two straight segment parts of a third conductor and two straight segment parts of a first conductor are separately located in a same stator slot, a pitch of the third conductor is y3, and the following is met: $y3=y1$.

In an embodiment of the present disclosure, the first conductor further includes a head and bending parts. The head is connected between one ends of the two straight segment parts of the first conductor. The other ends of the two straight segment parts of the first conductor are separately connected to the bending parts.

In an embodiment of the present disclosure, extension directions of bending parts of the first conductors located between adjacent second conductors are opposite, and extension directions of bending parts of the first conductors located outside the second conductor are the same.

The present disclosure further provides a motor, including a motor body; and a motor stator, mounted on the motor body. The motor stator includes a stator core, having stator slots, and a stator winding, inserted into the stator slot. The stator slot includes several slot layers, and the slot layers are disposed in a radial direction of the stator core. The stator winding includes a plurality of first conductors and a plurality of second conductors, and the first conductor and the second conductor each includes two straight segment parts. Straight segment parts of the plurality of first conductors are separately located at two adjacent slot layers. Both the first conductor and the second conductor include two straight segment parts, and one straight segment part of the second conductor and one straight segment part of the first conductor are located in a same stator slot. A pitch of the first conductor is y1, a pitch of the second conductor is y2, a pole pitch of the stator winding is $\tau$, at a same slot layer a distance between two adjacent first conductors is L1, a distance between two adjacent second conductors is L2, and the followings are met: $y1=\tau$, $L1=\tau$ or $L1=y2$, and $L2=\tau$.

In the figures: 100. motor stator; 200. welding end; 300. stator core; 400. hairpin end; 500. stator winding; 501. head; 502. straight segment part; 503. bending part; 510. first conductor; 511. first-type conductor; 512. second-type conductor; 520. second conductor; 530. third conductor; 600. motor body.

DETAILED DESCRIPTION

The following describes implementations of the present disclosure by using some specific examples. A person skilled in the art can easily understand other advantages and effects of the present disclosure based on the content disclosed in this specification. The present disclosure may be further implemented or applied by using other different specific implementations. Various details in this specification may also be modified or altered based on different viewpoints and applications without departing from the present disclosure.

It should be noted that the drawings provided in the embodiments merely describe the basic concept of the present disclosure by using examples. Although the drawings show only components related to the present disclosure, and are not drawn based on a quantity, a shape and a size of a component during actual implementation, a shape, a quantity, and a scale of each component may be arbitrarily changed during actual implementation, and a component layout form thereof may be more complex.

The present disclosure provides a motor stator and a motor to which the motor stator is applied, to resolve a problem that breakdown is prone to occur under a high-voltage condition due to a high position of a bending part of a winding.

The present disclosure provides a motor stator and a motor to which the motor stator is applied. Therefore, a problem that a plurality of coils of the stator winding are nested is resolved, a height of a bending part of a stator coil can be reduced, motor efficiency can be improved, a torque density and a power density of the motor are improved, a circulating current of the stator winding can be avoided, a loss is reduced, and problems of insulation damage and high-voltage breakdown caused by nesting the coils in a production process can be reduced.

The present disclosure provides a motor stator and a motor to which the motor stator is applied, and may be applied to the electrical servo transmission field, the transportation field, and the like. For example, the motor stator and the motor to which the motor stator is applied in the present disclosure may be applied to an electric vehicle. In the present disclosure, a circulating current of a stator winding can be avoided, a loss is reduced, a problem that a plurality of coils of the stator winding are nested is resolved, a height of a bending part of a stator coil is reduced, and motor efficiency is improved. The following describes the present disclosure in detail by using a specific embodiment.

Figure 1:
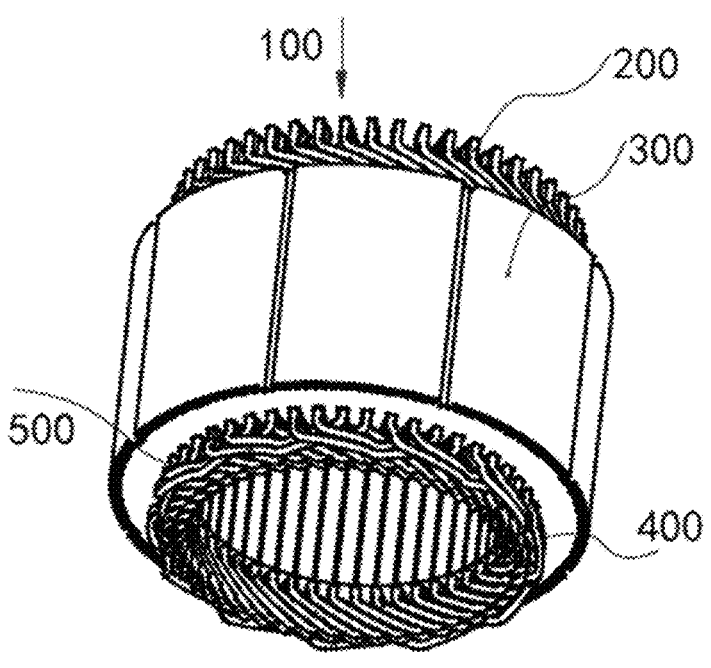
FIG. 1 is a schematic diagram of a structure of a motor stator according to the present disclosure.
Figure 2:
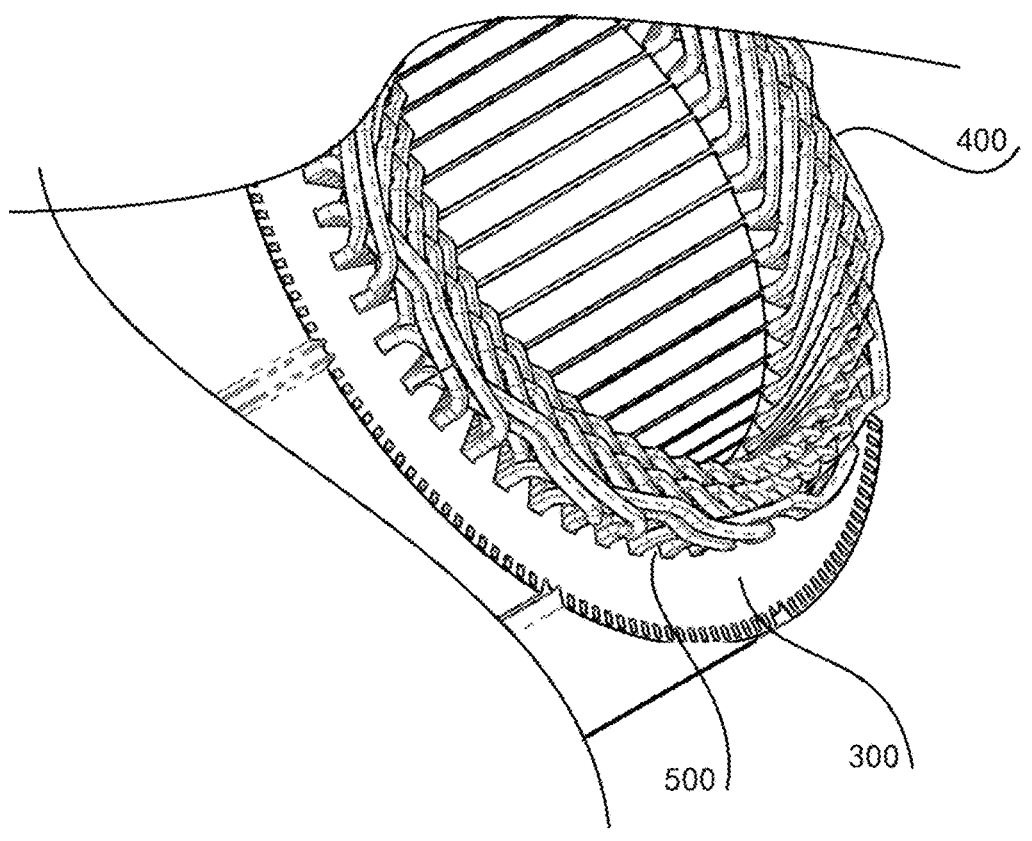
FIG. 2 is a schematic diagram of a structure of a hairpin end of a motor stator according to the present disclosure.
Figure 3:
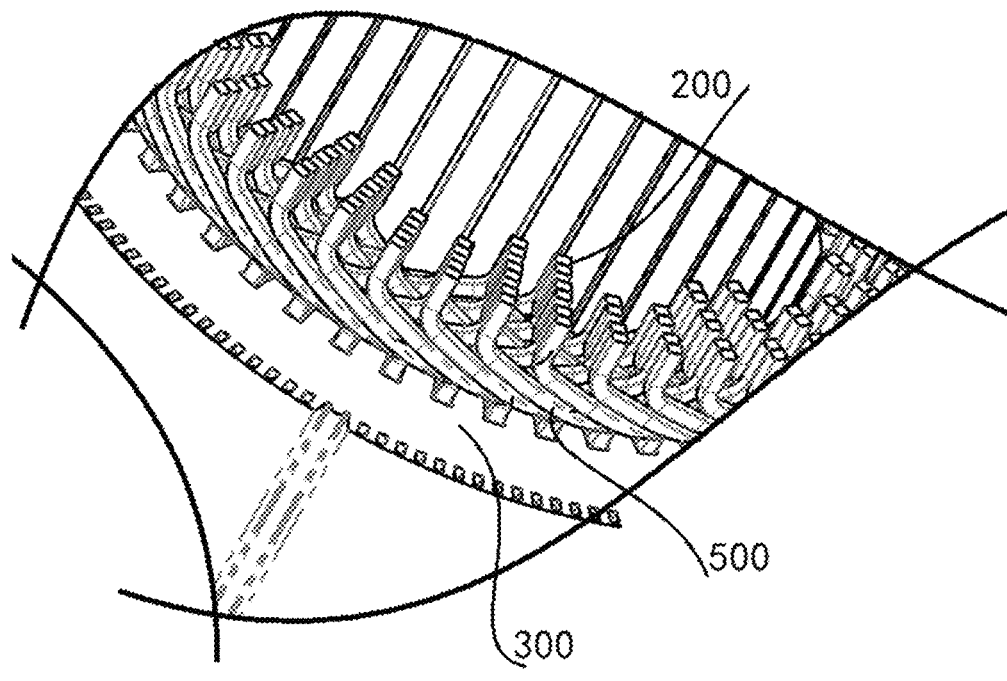
FIG. 3 is a schematic diagram of a structure of a welding end of a motor stator according to the present disclosure.
Figure 11:
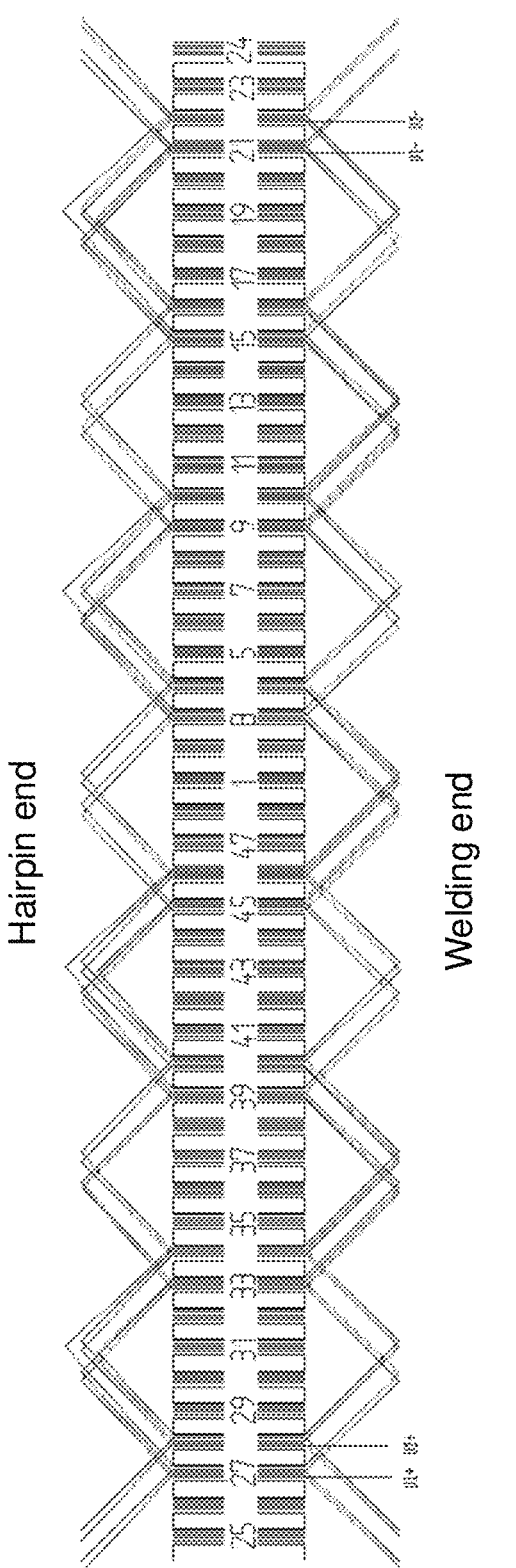
FIG. 11 is a wiring diagram of a stator winding in a motor stator according to the present disclosure.
Figure 12:
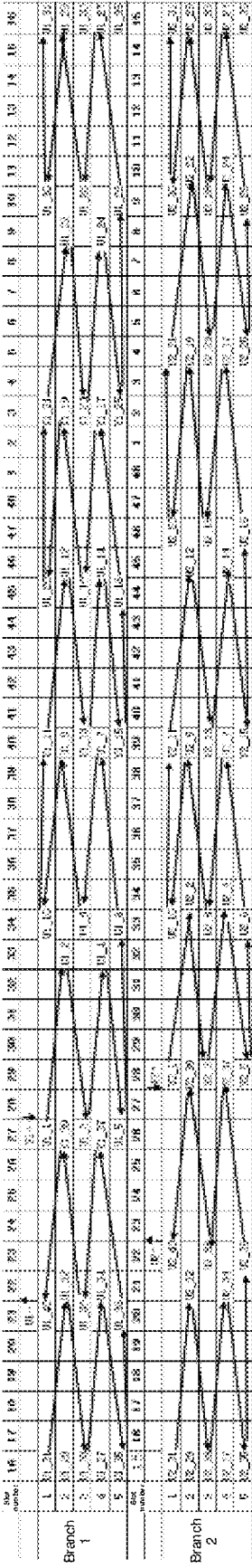
FIG. 12 is a schematic diagram of wire winding of a stator winding in a motor stator according to the present disclosure.
Figure 13:
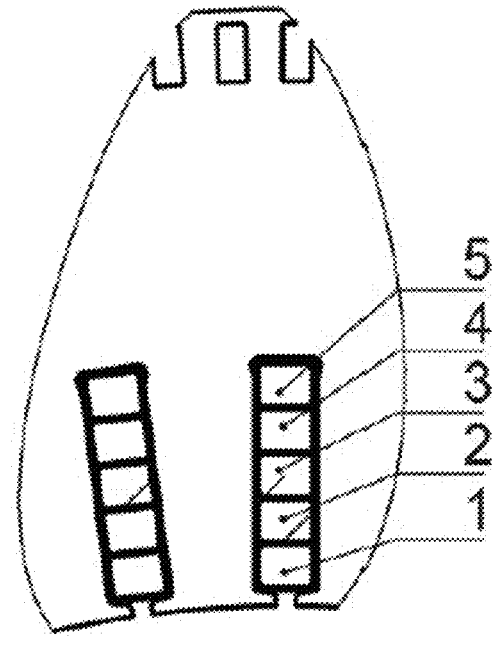
FIG. 13 is a schematic diagram of a stator slot in a motor stator according to the present disclosure.

Referring to FIG. 1 to FIG. 3, the present disclosure provides a motor stator. In some embodiments, the motor stator 100 may include a stator core 300 and a stator winding 500. The stator core 300 may be provided with a plurality of stator slots, and the stator slots may be formed on an inner surface of the stator core 300. The stator slots may be arranged along a circumferential direction of the stator core 300, and the stator slots may be spaced apart on the stator core 300 by a predetermined slot pitch. As shown in FIG. 11 and FIG. 12, the plurality of stator slots may be, respectively, a stator slot 1, a stator slot 2, a stator slot 3, and a stator slot 4 . . . along the circumferential direction of the stator core 300. For example, 48 stator slots may be arranged along the circumferential direction of the stator core 300. As shown in FIG. 13, a plurality of slot layers may be disposed in each stator slot. In some embodiments, an odd quantity of slot layers may be disposed in each stator slot. For example, five slot layers may be disposed in each stator slot. For example, the five slot layers in a radial direction of the stator core 300 from an inner side to an outer side may be, respectively, a slot layer 1, a slot layer 2, a slot layer 3, a slot layer 4, and a slot layer 5. That is, the slot layer 1 is located on a side close to the inside of the stator slot, and the slot layer 5 is located on a side close to the outside of the stator slot. In addition, specific numbers of slot layers of each stator slot are not limited, and the slot layers may be disposed from the inner side to the outer side in an order of 1 to 5, or may be disposed from the outer side to the inner side in an order of 1 to 5.

Referring to FIG. 4 to FIG. 6, FIG. 9, and FIG. 10, in some embodiments, the stator winding 500 may be inserted into the stator slots, and the stator winding 500 may include a plurality of first conductors 510 and a plurality of second conductors 520. The plurality of first conductors 510 may form a first coil group, and the first coil group may be located in the stator slot of the stator core 300. The plurality of second conductors 520 may form a second coil group, and the second coil group may be located in the stator slot of the stator core 300. The second coil group may be located on a side close to the inside of the stator slot.

Figure 4:
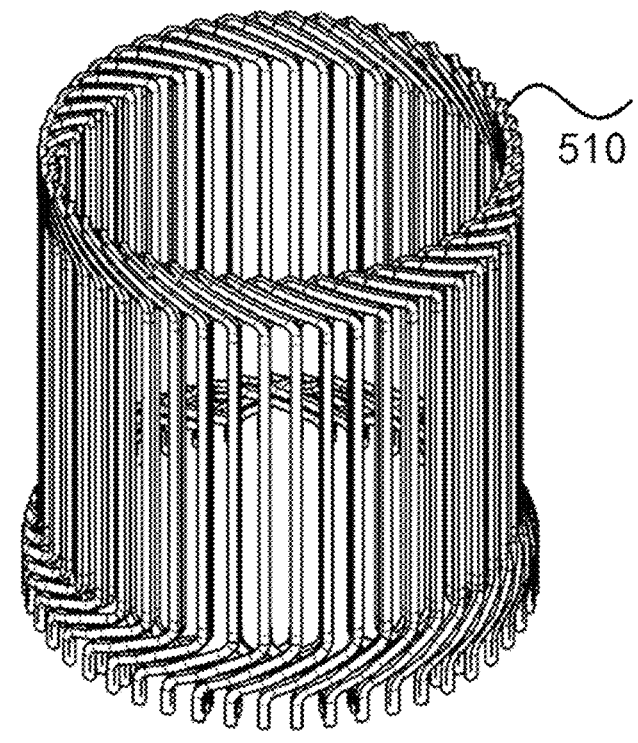
FIG. 4 is a schematic diagram of a structure of a first coil group formed by first conductors in a motor stator according to the present disclosure.
Figure 5:
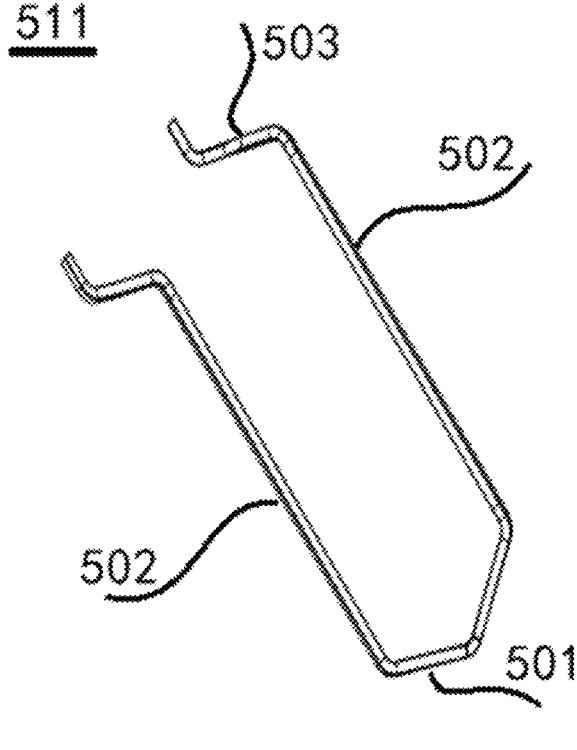
FIG. 5 is a schematic diagram of a structure of a first-type conductor among first conductors of a motor stator according to the present disclosure.
Figure 6:
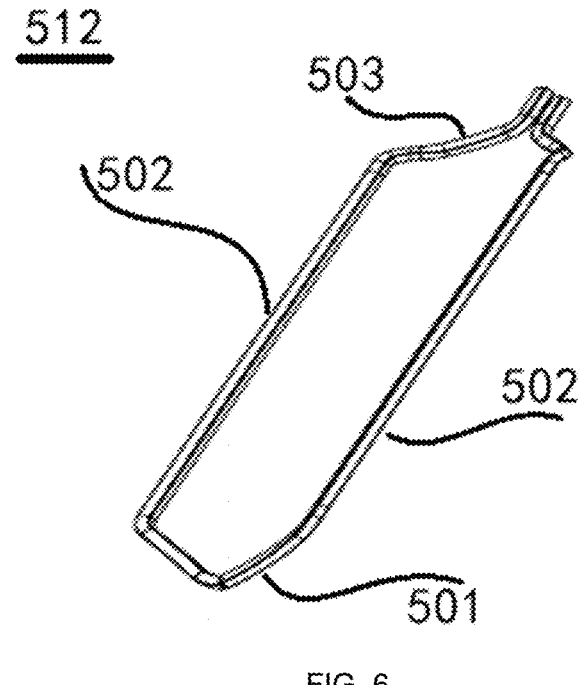
FIG. 6 is a schematic diagram of a structure of a second-type conductor among first conductors of a motor stator according to the present disclosure.
Figure 7:
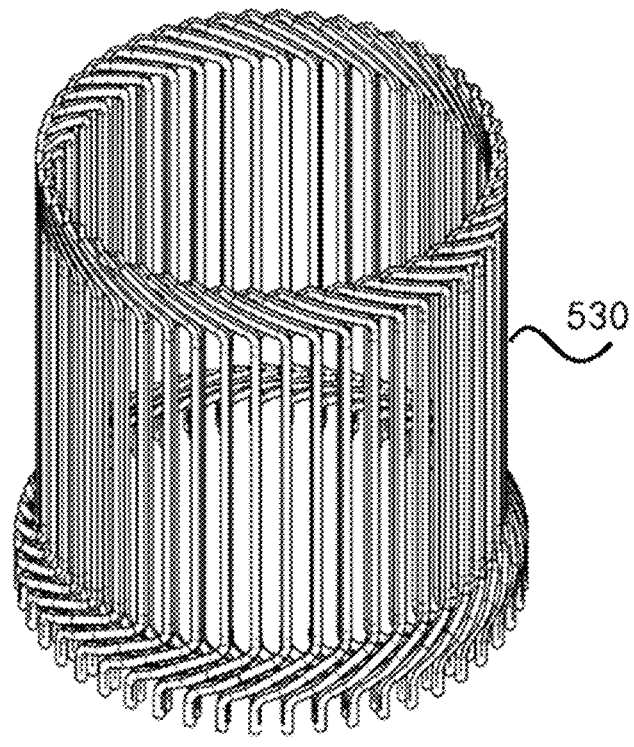
FIG. 7 is a schematic diagram of a structure of a third coil group formed by third conductors in a motor stator according to the present disclosure.
Figure 8:
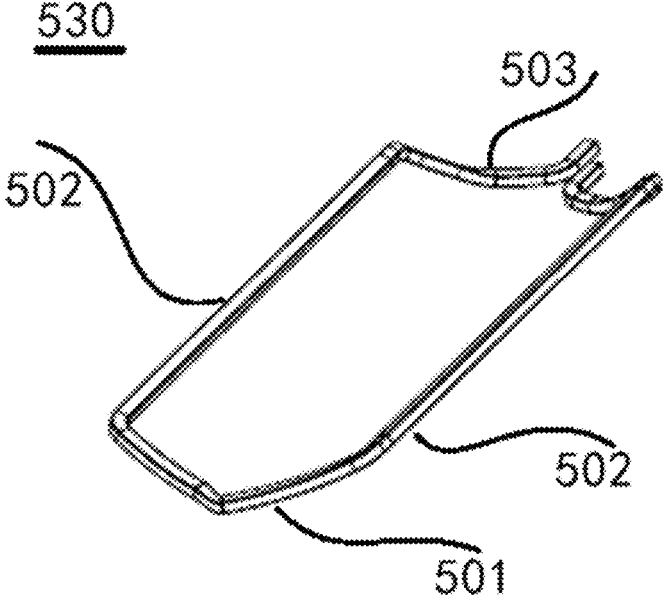
FIG. 8 is a schematic diagram of a structure of a third conductor in a motor stator according to the present disclosure.

Referring to FIG. 4 to FIG. 6, in some embodiments, the first conductor 510 may include a head 501, straight segment parts 502, and bending parts 503. The straight segment parts 502 may be configured to be inserted into corresponding stator slots, and two straight segment parts 502 of the first conductor 510 may be configured to be inserted into different stator slots. The head 501 may be connected between one ends of the two straight segment parts 502. The other ends of the two straight segment parts 502 may be connected to the bending parts 503.

Figures 9, 10:
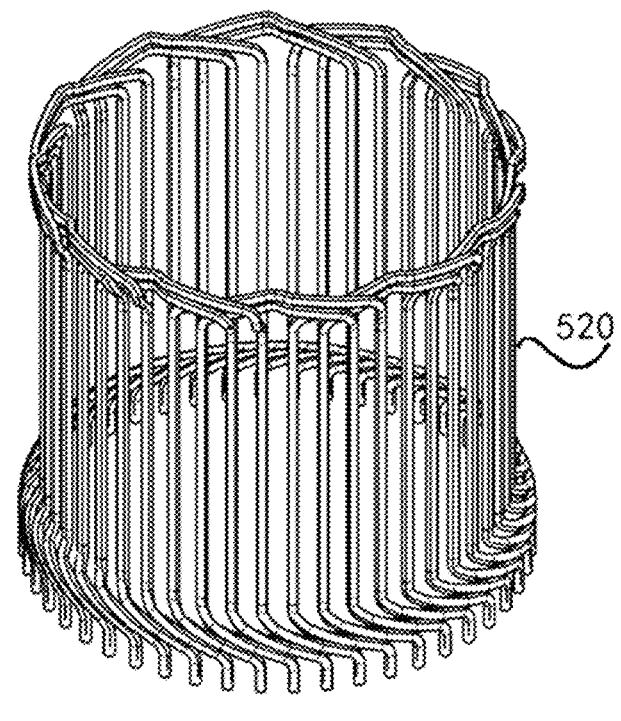
FIG. 9 is a schematic diagram of a structure of a second coil group formed by second conductors in a motor stator according to the present disclosure.
FIG. 10 is a schematic diagram of a structure of a second conductor in a motor stator according to the present disclosure.

Referring to FIG. 9 and FIG. 10, in some embodiments, a structure of the second conductor 520 may be similar to a structure of the first conductor 510. The second conductor 520 may include a head 501, straight segment parts 502, and bending parts 503. The straight segment parts 502 may be configured to be inserted into corresponding stator slots, and two straight segment parts 502 of the second conductor 520 may be configured to be inserted into different stator slots. The head 501 may be connected between one ends of the two straight segment parts 502. The other ends of the two straight segment parts 502 may be connected to the bending parts 503.

The following describes the first conductor 510 and the second conductor 520 in detail by using specific embodiments.

Referring to FIG. 4 to FIG. 6, in some embodiments, the first conductors 510 may include a first-type conductor 511 and a second-type conductor 512. The first-type conductor 511 may include a head 501, straight segment parts 502, and bending parts 503. The straight segment parts 502 may be configured to be inserted into corresponding stator slots, and two straight segment parts 502 of the first-type conductor 511 may be configured to be inserted into different stator slots. The head 501 may be connected between one ends of the two straight segment parts 502. The other ends of the two straight segment parts 502 may be connected to the bending parts 503.

The second-type conductor 512 may include a head 501, straight segment parts 502, and bending parts 503. The straight segment parts 502 may be configured to be inserted into corresponding stator slots, and two straight segment parts 502 of the second-type conductor 512 may be configured to be inserted into different stator slots. The head 501 may be connected between one ends of the two straight segment parts 502. The other ends of the two straight segment parts 502 may be connected to the bending parts 503. A difference between the first-type conductor 511 and the second-type conductor 512 lies in that the two bending parts 503 of the first-type conductor 511 have a same extension direction and face in a same direction; and the two bending parts of the second-type conductor 512 have opposite extension directions and face in opposite directions.

Referring to FIG. 9 and FIG. 10, in some embodiments, the second conductors 520 may be configured to have two parts. Pitches of one part of the second conductors 520 may be greater than a pole pitch of the stator winding 500, pitches of the other part of the second conductors 520 may be less than the pole pitch of the stator winding 500, and a sum of the pitches of the two parts of the second conductors 520 may be twice the size of the pole pitch of the stator winding 500. For example, the pole pitch of the stator winding 500 has a size of six slot pitches, the pitches of one part of second conductors 520 may have a size of five slot pitches, and the pitches of the other part of second conductors 520 may have a size of seven slot pitches.

Referring to FIG. 11 and FIG. 12, in some embodiments, straight segment parts 502 of the plurality of first conductors 510 may be separately located at two adjacent slot layers. The straight segment part 502 of the second conductor 520 and the straight segment part 502 of the first conductor 510 may be located in a same stator slot. A size of a pitch of the first conductor 510 may be the same as a size of the pole pitch of the stator winding 500. In some embodiments, a distance between straight segment parts 502 of two adjacent first conductors 510 at a same slot layer may be the pole pitch of the stator winding 500, or may be the pitch of the second conductor 520, and a distance between straight segment parts 502 of two adjacent second conductors 520 may be the pole pitch of the stator winding 500. For example, the size of the pitch of the first conductor is y1, the size of the pitch of the second conductor is y2, the pole pitch of the stator winding is τ, the distance between the straight segment parts 502 of the two adjacent first conductors 510 at the same slot layer is L1, the distance between the straight segment parts 502 of the two adjacent second conductors is L2, and the followings are met: y1=τ, L1=τ or L1=y2, and L2=τ.

Referring to FIG. 1 to FIG. 3, FIG. 11, and FIG. 12, in some embodiments, a quantity of stator slots of the stator core 300 may be, for example, 48. The stator windings 500 may include a plurality of phase windings, and the plurality of phase windings are different from each other in terms of electrical phase. For example, the stator winding 500 may include three phase windings. Each phase winding may include two branch windings, and the two branch windings may be connected in series or parallel. Each branch winding may include eight magnetic poles. The pole pitch of the stator winding may have a size of six slot pitches. A quantity of slots per phase per pole is 2, q=z/2 pm, q is a quantity of slots per phase per pole, z is a quantity of stator slots, 2p is a quantity of poles of the motor, and m is a quantity of phases of the motor.

Referring to FIG. 1 to FIG. 3, FIG. 11, and FIG. 12, the size of the pitch of the first conductor 510 may be the same as the size of the pole pitch of the stator winding 500, and may be six slot pitches. A size of pitches of one part of second conductors 520 may have a size of seven slot pitches, and a size of pitches of the other part thereof may have a size of five slot pitches. In one branch winding, at a same slot layer, a distance between straight segment parts 502 of two adjacent first conductors 510 may be five slot pitches, six slot pitches, or seven slot pitches. A distance between straight segment parts 502 of two adjacent second conductors 520 may have a size of six slot pitches. In this case, the second conductors 520 with pitches of seven slot pitches and the second conductors 520 with pitches of five slot pitches may be alternately arranged along the circumferential direction of the stator core 300, and the first conductor 510 and the second conductor 520 may be filled in a same stator slot.

An end that is of the stator winding 500 and that is located on the head 501 of the first conductor 510 and the head 501 of the second conductor 520 is a hairpin end 400. An end that is of the stator winding 500 and that is located on the bending part 503 of the first conductor 510 and the bending part 503 of the second conductor 520 may be a welding end 200.

Referring to FIG. 1 to FIG. 3, FIG. 11, and FIG. 12, in some embodiments, each phase winding may include two branch windings, sizes of pitches of one part of second conductors 520 may be seven slot pitches, and sizes of pitches of the other part of second conductors 520 may be five slot pitches. A second conductor 520 with a pitch of five slot pitches in the first branch winding and a second conductor 520 with a pitch of seven slot pitches in the second branch winding may be located in adjacent stator slots. That is, when one straight segment part 502 of the second conductor 520 in the first branch winding and one straight segment part 502 of the second conductor 520 in the second branch winding are located in adjacent stator slots, the other straight segment part 502 of the second conductor 520 in the first branch winding and the other straight segment part 502 of the second conductor 520 in the second branch winding are located in adjacent stator slots, that is, the second conductor 520 with a pitch of seven slot pitches surrounds the second conductor 520 with a pitch of five slot pitches.

As shown in FIG. 11 and FIG. 12, when a wire entry end of the first branch winding may be located at a slot layer 1 of a stator slot 27, a wire exit end of the branch winding may be located at a slot layer 1 of a stator slot 21, and when a wire entry end of the second branch winding may be located at a slot layer 1 of a stator slot 28, a wire exit end of the second branch winding may be located at a slot layer 1 of a stator slot 22. When the wire entry end of the first branch winding may be located at the slot layer 1 of the stator slot 27, the wire entry end of the second branch winding may be located at the slot layer 1 of the stator slot 28. Wire winding is performed in this wire winding manner, so that a wire winding structure of each phase winding of the stator winding 500 can be optimized. In this wire winding manner, a wire entry end and a wire exit end of each branch winding can be disposed on a same side of the stator winding 500, so that a height of the welding end 200 can be fully used.

Wire entry ends of the two branch windings are located in adjacent stator slots, so that the wire entry ends of the two branch windings can be conveniently welded. Similarly, wire exit ends of the two branch windings are located in adjacent stator slots to facilitate welding. In this case, the two branch windings are connected in parallel. In some embodiments, the two branch windings may alternatively be connected in series. For example, a wire exit end of one branch winding may be connected to a wire entry end of the other branch winding by using a wire. The two branch windings are connected to form one phase winding, so that a quantity of turns can be adjusted, and an unbalanced current is not easily generated. Therefore, a circulating current can be avoided, and the motor can be prevented from failing.

The second conductors 520 form a second coil group. In the second coil group, a second conductor 520 with a pitch of seven slot pitches may be located on the outside of a second conductor 520 with a pitch of five slot pitches, that is, the second conductor 520 with a pitch of seven slot pitches surrounds the second conductor 520 with a pitch of five slot pitches. The first conductors 510 form a first coil group, and the first conductors 510 in the first coil group are in a non-coplanar relationship. In the present disclosure, the problem that a plurality of coils of the stator winding are nested is resolved, a height of the bending part of the stator coil can be reduced, motor efficiency can be improved, a torque density and a power density of the motor are improved, a circulating current of the stator winding can be avoided, a loss is reduced, and problems of insulation damage and high-voltage breakdown caused by nesting the coils in a production process can be reduced. In addition, an odd quantity of layers of windings are used to resolve the problem of allocating a quantity of conductors connected in series per phase, so that a motor with a specific power and torque requirement can be designed.

Referring to FIG. 1 to FIG. 3, FIG. 7, and FIG. 8, in some embodiments, the motor stator may include third conductors 530. In some embodiments, a third conductor 530 may include a head 501, straight segment parts 502, and bending parts 503. The straight segment parts 502 may be configured to be inserted into corresponding stator slots, and two straight segment parts 502 of the third conductor 530 may be configured to be inserted into different stator slots. The head 501 may be connected between one ends of the two straight segment parts 502. The other ends of the two straight segment parts 502 may be connected to the bending parts 503. The third conductors 530 may form a third coil group, and the third coil group may be located between the first coil group and the second coil group, wherein there is at least one third coil group.

Referring to FIG. 1 to FIG. 3, FIG. 7, FIG. 8, FIG. 11, and FIG. 12, in some embodiments, the straight segment parts 502 of the third conductor 530 may be separately located at two adjacent slot layers. A size of a pitch of the third conductor 530 may be the same as the size of the pitch of the first conductor 510. The third conductor 530 and the first conductor 510 may be in a parallel relationship. The pitch of the third conductor is y3, and y3=y1 is met.

Referring to FIG. 4 to FIG. 10, in some embodiments, extension directions of bending parts 503 of the second conductors 520 are the same, and the second conductors 520 form a second coil group. The extension directions of the bending parts 503 of the second conductors 520 in the second coil group are the same, and may be a clockwise direction or a counterclockwise direction. Extension directions of the bending parts 503 of the third conductors 530 are opposite, and the third conductors 530 form a third coil group. An extension direction of one bending part 503 of the third conductor 530 in the third coil group may be a clockwise direction or a counterclockwise direction, while an extension direction of the other bending part 503 of the third conductor 530 is opposite. The first conductors 510 may form a first coil group, wherein extension directions of bending parts 503 of one part of the first conductors 510 are the same, while extension directions of bending parts 503 of the other part of the first conductors 510 are opposite. For example, extension directions of the bending parts 503 of the first conductors 510 located between adjacent second conductors 520 may be opposite. One bending parts 503 of the part of the first conductors 510 may extend clockwise or counterclockwise in the first coil group, and extension directions of the other bending parts 503 of the first conductors 510 are opposite thereto. Extension directions of bending parts 503 of first conductors 510 located outside the second conductors 520 may be the same, and the bending parts 503 of the part of the first conductors 510 may extend in a counterclockwise or clockwise direction in the first coil group. The extension direction of the bending part 503 of the first conductor 510, the extension direction of the bending part 503 of the second conductor 520, and the extension direction of the bending part 503 of the third conductor 530 are not specifically limited, and should meet a wiring diagram shown in FIG. 12.

Figure 14:
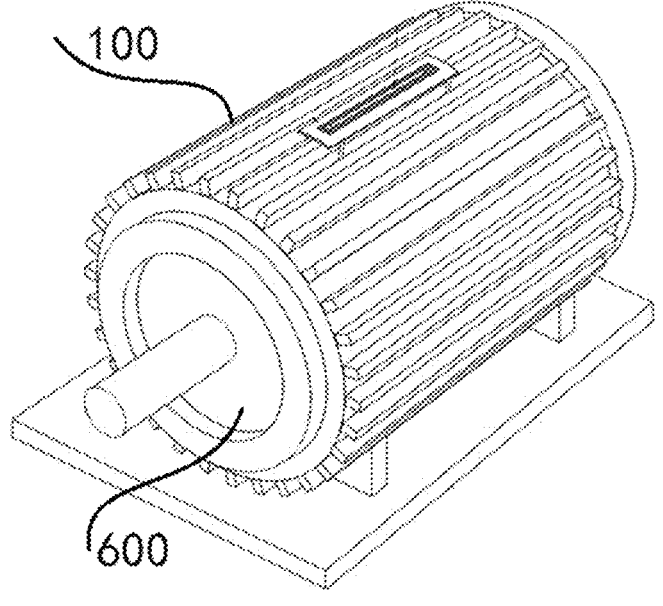
FIG. 14 is a schematic diagram of a structure of a motor according to the present disclosure.

Referring to FIG. 14, in some embodiments, the present disclosure further provides a motor, including a motor stator 100 and a motor body 600. The motor stator 100 is mounted on the motor body 600. The motor stator 100 includes a stator core 300 and a stator winding 500. The stator core 300 may have stator slots. A stator slot may include several slot layers, and the slot layers may be disposed along a radial direction of the stator core 300. The stator winding 500 may be inserted into the stator slots, the stator winding 500 may include a plurality of first conductors 510 and a plurality of second conductors 520, and each of the first conductors 510 and the second conductors 520 may include two straight segment parts. The plurality of first conductors 510 may be separately located at two adjacent slot layers. A straight segment part of a second conductor 520 and a straight segment part of a first conductor 510 may be located in a same stator slot. A size of a pitch of the first conductor 510 is the same as a size of a pole pitch of the stator winding 500. A distance between two straight segment parts 502 of two adjacent first conductor 510 at a same slot layer may be the pole pitch or a pitch of the second conductor 520. A distance between straight segment parts 502 of two adjacent second conductors 520 may be the pole pitch.

In conclusion, the present disclosure provides a motor stator and a motor to which the motor stator is applied, to enable a wire entry end and a wire exit end of each branch winding to be disposed on a same side of the stator winding, so that a height of a welding end can be fully used. In the present disclosure, a problem that a plurality of coils of the stator winding are nested is further resolved, a height of a bending part of a stator coil can be reduced, motor efficiency can be improved, a torque density and a power density of the motor are improved, a circulating current of the stator winding can be avoided, a loss is reduced, and problems of insulation damage and high-voltage breakdown caused by nesting the coils in a production process can be reduced. In addition, an odd quantity of layers of windings are used to resolve a problem of allocating a quantity of conductors connected in series per phase, so that a motor with a specific power and torque requirement can be designed.

The above description is only some embodiments of the present disclosure and the explanation of the applied technical principles. It should be understood by a person skilled in the art that the scope involved in the present disclosure is not limited to the technical solutions formed by the specific combination of the above technical features, but should also cover other technical solutions formed by any combination of the above technical features or equivalent features thereof without departing from the present disclosure, such as the technical solutions formed by replacing the above features and (but not limited to) technical features having similar functions disclosed in the present disclosure with each other.

Technical features other than the technical features described in the specification are known to a person skilled in the art, and to highlight the innovative features of the present disclosure, the remaining technical features are not repeated herein.

What is claimed is:

1. A motor stator, comprising:
a stator core having stator slots, each of the stator slots comprising slot layers; and
a stator winding inserted into the stator slots, the stator winding comprising first conductors and second conductors,
wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and
wherein a pitch of each of the first conductors is y1, a pitch of each of the second conductors is y2, a pole pitch of the stator winding is $\tau$, a distance between two adjacent ones of the first conductors at a same one of the slot layers is L1, a distance between two adjacent ones of the second conductors at a same one of the slot layers is L2, and the followings are met: $y1=\tau$, $L1=\tau$ or $L1=y2$, and $L2=\tau$.

2. The motor stator according to claim 1, wherein the two straight segment parts of the second conductor are located at a same slot layer.

3. The motor stator according to claim 1, wherein the stator winding comprises at least one phase winding.

4. The motor stator according to claim 3, wherein each phase winding comprises at least two branch windings, and the branch windings are connected in series or in parallel.

5. The motor stator according to claim 3, wherein each phase winding comprises two branch windings, and straight segment parts of second conductors in the two branch windings are located in adjacent stator slots.

6. The motor stator according to claim 5, wherein straight segment parts of first conductors in the two branch windings are located in adjacent stator slots.

7. The motor stator according to claim 1, wherein the stator winding further comprises:
third conductors, located between the first conductors and the second conductors, wherein two straight segment parts of a third conductor and two straight segment parts of a first conductor are separately located in a same stator slot, a pitch of the third conductor is y3, and the following is met: $y3=y1$.

8. The motor stator according to claim 1, wherein the first conductor further comprises:
a head, the head being connected between one ends of the two straight segment parts of the first conductor; and
bending parts, the other ends of the two straight segment parts thereof being separately connected to the bending parts.

9. The motor stator according to claim 8, wherein extension directions of bending parts of the first conductors located between adjacent second conductors are opposite, and extension directions of bending parts of the first conductors located outside the second conductor are the same.

10. A motor, comprising:
a motor body; and
a motor stator, mounted on the motor body, the motor stator comprising:
a stator core having stator slots, each of the stator slots comprising slot layers; and
a stator winding inserted into the stator slots, the stator winding comprising first conductors and second conductors,
wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and
wherein a pitch of each of the first conductors is y1, a pitch of each of the second conductors is y2, a pole pitch of the stator winding is T, a distance between two adjacent ones of the first conductors at a same one of the slot layers is L1, a distance between two adjacent ones of the second conductors at a same one of the slot layers is L2, and the followings are met: $y1=1$, $L1=\tau$ or $L1=y2$, and $L2=\tau$.

11. The motor according to claim 10, wherein the two straight segment parts of the second conductor are located at a same slot layer.

12. The motor according to claim 10, wherein the stator winding comprises at least one phase winding.

13. The motor according to claim 12, wherein each phase winding comprises at least two branch windings, and the branch windings are connected in series or in parallel.

14. The motor according to claim 12, wherein each phase winding comprises two branch windings, and straight segment parts of second conductors in the two branch windings are located in adjacent stator slots.

15. The motor according to claim 14, wherein straight segment parts of first conductors in the two branch windings are located in adjacent stator slots.

16. The motor according to claim 10, wherein the stator winding further comprises:
third conductors, located between the first conductors and the second conductors, wherein two straight segment parts of a third conductor and two straight segment parts of a first conductor are separately located in a same stator slot, a pitch of the third conductor is y3, and the following is met: $y3=y1$.

17. The motor according to claim 10, wherein the first conductor further comprises:
a head, the head being connected between one ends of the two straight segment parts of the first conductor; and bending parts, the other ends of the two straight segment parts thereof being separately connected to the bending parts.

18. The motor according to claim 17, wherein extension directions of bending parts of the first conductors located between adjacent second conductors are opposite, and extension directions of bending parts of the first conductors located outside the second conductor are the same.

19. A vehicle, comprising a motor, wherein the motor comprises:

a motor body; and a motor stator, mounted on the motor body, the motor stator comprising:

a stator core having stator slots, each of the stator slots comprising slot layers; and a stator winding inserted into the stator slots, the stator winding comprising first conductors and second conductors, wherein each of the first conductors and the second conductors comprises two straight segment parts, the straight segment parts of the first conductors are separately located at two adjacent ones of the slot layers, and one of the straight segment parts of the second conductor and one of the straight segment parts of the first conductor are located in a same one of the stator slots; and wherein a pitch of each of the first conductors is y1, a pitch of each of the second conductors is y2, a pole pitch of the stator winding is $\tau$, a distance between two adjacent ones of the first conductors at a same one of the slot layers is L1, a distance between two adjacent ones of the second conductors at a same one of the slot layers is L2, and the followings are met: y1=1, L1=$\tau$ or L1=y2, and L2=$\tau$.

20. The vehicle according to claim 19, wherein the vehicle is an electric vehicle.

*   *   *   *   *